Figure 1:
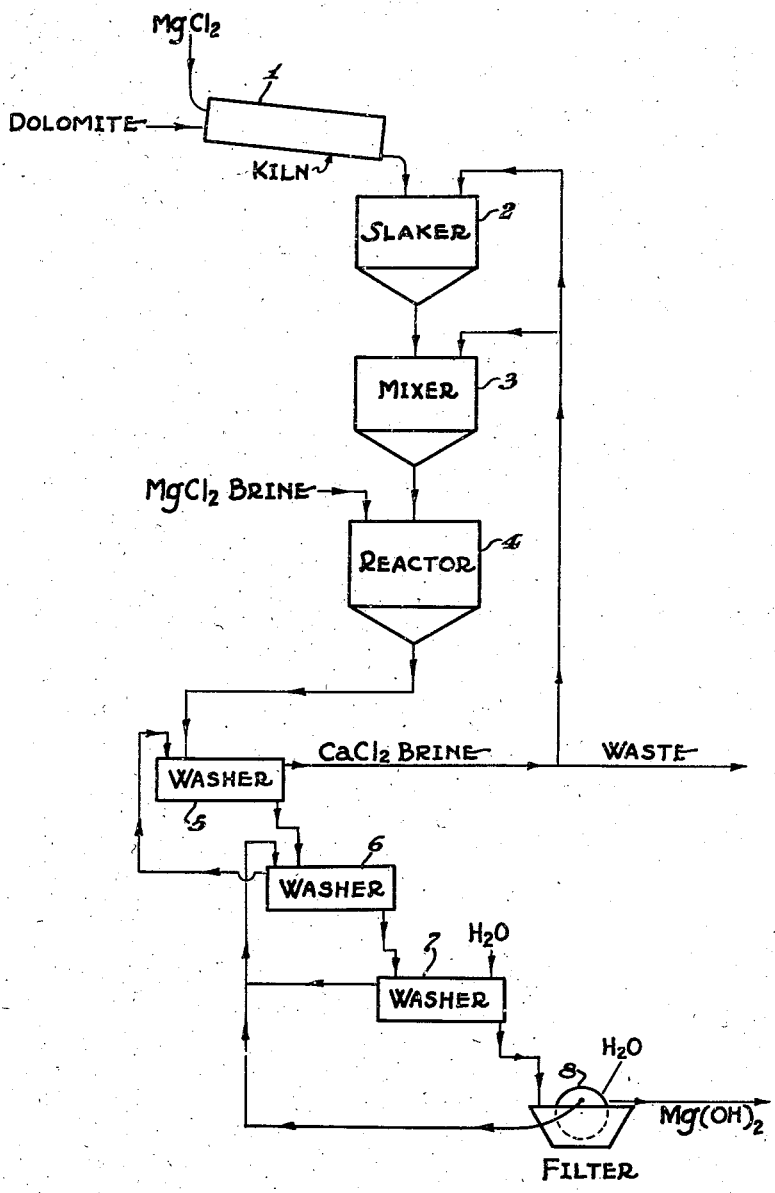

April 17, 1945.                R. D. PIKE                    2,373,912
                    PRODUCTION OF MAGNESIA FROM DOLOMITE
                    Filed Dec. 17, 1942        2 Sheets-Sheet 1

INVENTOR.
ROBERT D. PIKE

April 17, 1945. R. D. PIKE 2,373,912
PRODUCTION OF MAGNESIA FROM DOLOMITE
Filed Dec. 17, 1942 2 Sheets-Sheet 2

INVENTOR.
ROBERT D. PIKE.

Patented Apr. 17, 1945

2,373,912

UNITED STATES PATENT OFFICE 2,373,912

PRODUCTION OF MAGNESIA FROM DOLOMITE

Robert D. Pike, Pittsburgh, Pa., assignor to Harbison-Walker Refractories Company, Pittsburgh, Pa., a corporation of Pennsylvania Application December 17, 1942, Serial No. 469,345

5 Claims. (Cl. 23—201)

This invention relates to the production of magnesia from dolomite.

It has been proposed to recover magnesia from dolomite by processes involving calcination of the rock, hydration of the calcine, and treatment of the hydrated material with a convertible magnesium compound, such as magnesium chloride ($MgCl_2$) brine, to precipitate magnesium hydrate ($Mg[OH]_2$) and convert the hydrated lime ($Ca[OH]_2$) to calcium chloride ($CaCl_2$) which is separated as a brine from the precipitated magnesia. Such procedures have generally been unsatisfactory for commercial operation because the magnesium hydrate was produced in a form that settled very slowly and could not be filtered and washed rapidly.

It has been proposed also to use the calcium chloride brine produced in that way to treat a further amount of the hydrated calcine to regenerate magnesium chloride brine for the foregoing precipitation of magnesium hydrate, and in this branch to use the carbon dioxide ($CO_2$) from the kiln to produce calcium carbonate ($CaCO_3$), thus providing a cyclic process. Such cyclic processes have been subject to the same disadvantages which are aggravated by the slow settling and poor filtering properties of the calcium carbonate. Also, the magnesia and carbonate produced may be of low quality.

Although those processes are theoretically operable and are desirable in principle, factors such as those indicated have rendered them uneconomical and they have made no commercial impression.

It is among the objects of this invention to provide a process of producing hydrated magnesia from dolomite by reaction of hydrated dolomite calcine with magnesium chloride which produces magnesium hydrate of high quality in a form which settles rapidly and filters and washes easily, and which is easily practiced, economical, and offers no difficulties in control and operation.

A further object is to provide a cyclic process of the foregoing type in which the calcium chloride brine from the magnesia precipitation and carbon dioxide are applied to regenerate magnesium chloride brine and produce calcium carbonate, and which is simple and easily practiced and produces carbonate of high purity and excellent settling and filtering characteristics.

A further object is to provide a process of calcining dolomite for the attainment of the foregoing objects.

Other objects will appear from the following description of the invention.

The invention will be described in connection with accompanying drawings in which Fig. 1 is a flow sheet representing the application of the invention to a non-cyclic process of producing magnesia, and Fig. 2 a flow sheet illustrative of a cyclic process for producing both magnesia and calcium carbonate in accordance with the invention.

The invention is concerned particularly with the production of magnesia from dolomite by a procedure involving calcination of the dolomite, hydration of the calcine, and treatment of the hydrated calcine with magnesium chloride brine, or other convertible magnesium compound, for the purpose of converting the lime to soluble calcium chloride and simultaneously precipitating hydrated magnesia. In accordance with one embodiment this is conducted in a non-cyclic manner; however, the invention is not restricted thereto, but is applicable also to a cyclic process of the type generally indicated above.

The invention is predicated in part upon my discovery that in both its cyclic and non-cyclic embodiments the settling and filtering properties of the products are very markedly and favorably influenced by calcining the dolomite in admixture with a very small amount of a thermally decomposable chloride. Magnesium chloride constitutes the preferred chloride for this purpose, and it will be referred to hereinafter, therefore, in describing the invention. Stated otherwise, I have found that by having a small amount of magnesium chloride distributed throughout the dolomite while it is being calcined the rate of filtration of the precipitated magnesia is increased remarkably, even as much as several hundred per cent, compared with a process which is identical except that no chloride is present during the calcining operation. Equivalent advantage is to be had in both non-cyclic and cyclic processes of the type described.

In the practice of the invention the amount of chloride which is mixed with the raw dolomite is suitably such that the hydrogen chloride (HCl) released during calcining is not over about 0.5 per cent by weight, based on the dolomite. In the case of magnesium chloride, there is used from about 0.1 to 1 per cent, suitably about 0.5 per cent, by weight based on the dolomite. The magnesium chloride may be mixed as a solid with the crushed dolomite, but to insure thorough and uniform distribution throughout the rock it is preferably applied in the form of a brine, such as that which is used or recovered in the succeeding steps of the process.

I have discovered further, and the invention is in part predicated upon this also, that in the case of a cyclic process substantial advantage attends the use of classification in the magnesia branch to separate the hydrated calcine and the precipitated magnesia into coarse and fine fractions, the coarse material being continued in the magnesia branch and the fine material being passed to the carbonate branch. This removal of fines enhances the improvement in the settling and filtering rate of the magnesia which is obtained as just described, and the fines are adapted to use in the carbonate branch to produce high quality and free-filtering calcium carbonate.

The invention may be described further with reference to the accompanying drawings. Considering first its simplest embodiment, i. e., a non-cyclic process for producing magnesia, raw dolomite mixed with an appropriate amount of magnesium chloride, as described above, is passed to a kiln 1 (Fig. 1). Most suitably there is used a quite pure dolomite, such, for example, as that from the Niagara formation of northwestern Ohio, which contains not over about 0.75 per cent of impurities and in which the ratio of lime to magnesia is almost theoretically correct for pure dolomite. The calcination should be such as to decompose the carbonates substantially completely, and suitably produce a calcine containing less than about 0.3 per cent ignition loss. This may be accomplished by firing the kiln at about 2450° to 2500° F.

The calcine is passed to a container 2 where it is slaked, or hydrated. For this purpose there may be used fresh water or sea water, or in the latter case the spent liquor remaining after reaction with calcined dolomite. Preferably, however, the hydration is carried out with a calcium chloride brine which is free, or substantially free, from magnesium chloride. The amount of liquid used is such as to convert the calcine to a putty-like consistency, say to a hydrate containing about 35 per cent by weight of solids. The preliminarily hydrated material is then passed to a mixer 3 to which sufficient additional slaking liquid is added to produce a free flowing pulp, say a pulp containing about 20 per cent of solids. From the mixer the hydrated material passes to a reactor 4 where it is mixed with magnesium chloride brine which reacts with the lime of the dolomite to form calcium chloride brine and precipitate hydrated magnesia. After the reaction has been completed the mixture is subjected to counter-current washing, suitably in the counter-current thickening washers 5, 6 and 7. The underflow from the last washer is passed to a filter 8, where the cake is washed, the filtrate and wash water being returned to washer 6 together with the overflow from washer 7. The overflow from washer 6 is introduced into the first thickening washer 5, the overflow of which constitutes a calcium chloride brine that may be passed to slaker 2 and mixer 3 for hydrating and diluting the calcine.

By this procedure the hydrated magnesia is produced in a form which settles much more rapidly and filters and washes much more freely than is the case where the dolomite is calcined without having $MgCl_2$ present. Thereby high quality magnesia is produced more rapidly and with smaller equipment, which renders the process more economical. The hydrated magnesia from filter 8 may be used as such or it may be dried or calcined, according to need.

Figure 2:
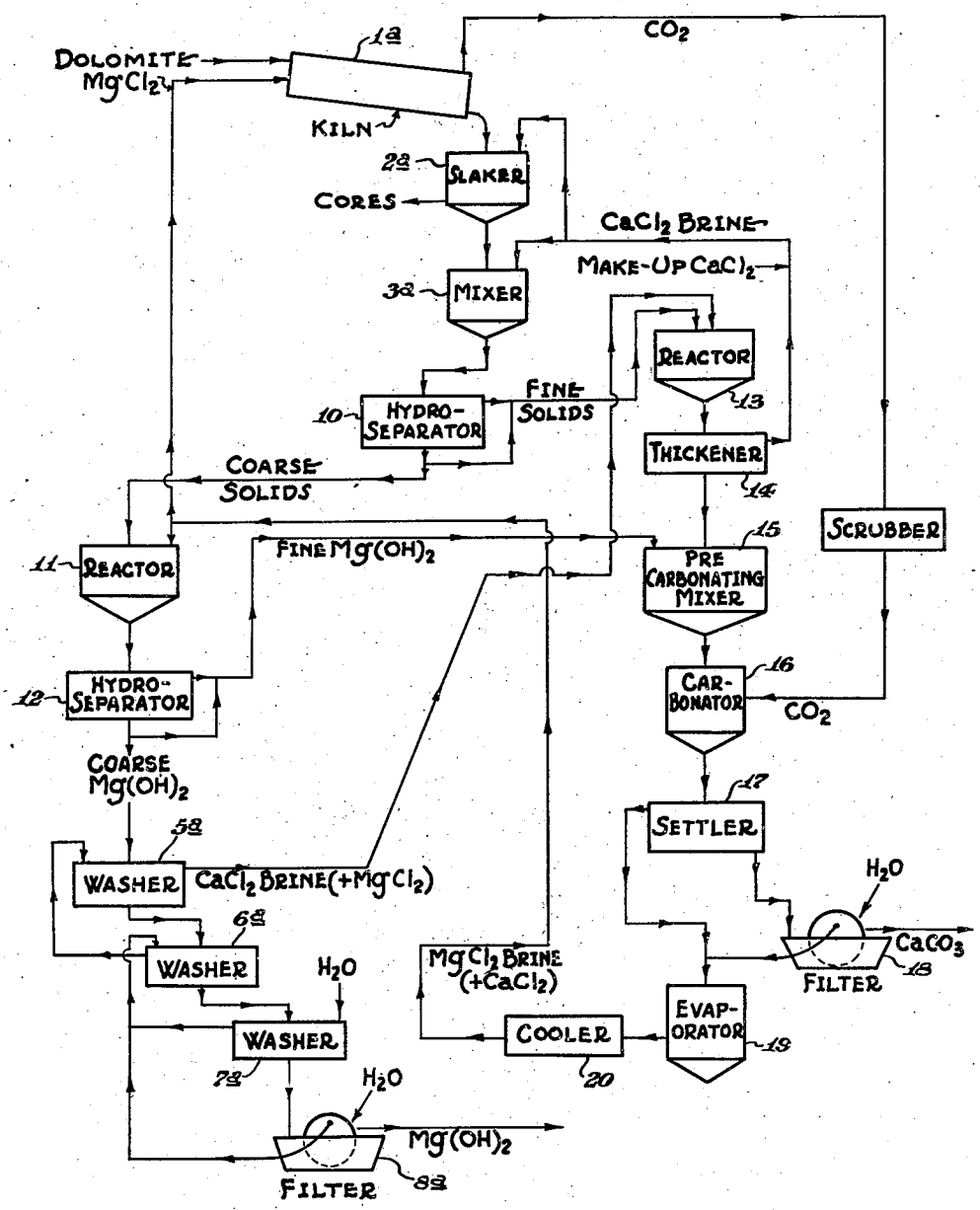

The same benefit is to be had with a cyclic process, and Fig. 2 is illustrative of such a process embodying also the classification procedure of this invention. As in the case of Fig. 1, dolomite carrying $MgCl_2$ is calcined in a kiln 1a and the calcine is slaked with $CaCl_2$ brine in a slaker 2a to produce a hydrated product that is mixed in a mixer 3a with a further amount of the brine to produce a free flowing slurry.

The slurry from mixer 3a then passes to a hydro-separator 10 the underflow from which, comprising the coarse material and the larger part of the solids, passes to a reactor 11 where it is mixed with a $MgCl_2$ brine, the $MgCl_2$ being in about 108 per cent excess over the requirement of the reaction. The product, a pulp of hydrated magnesia and a brine rich in calcium chloride, but containing all of the unreacted $MgCl_2$, passes to a second hydro-separator 12. The coarser $Mg(OH)_2$ leaves in the underflow from separator 12 and is subjected to counter-current washing, preferably in the washing thickeners 5a, 6a and 7a, as described in connection with Fig. 1, the hydrate being collected and washed on a filter 8a from which it is removed for use.

Turning now to the carbonate branch, the overflow from hydro-separator 10 composed mostly of fine solids, is passed to a container 13 where it is reacted with $CaCl_2$ brine containing some $MgCl_2$ which is the end brine of the magnesia branch, to produce hydrated magnesia and a $CaCl_2$-rich brine. An adjustment line as shown may be provided between the under- and overflow lines of the hydro-separator so that the feed to reactor 13 may be made adequate in case the fines, or overflow does not suffice for this branch. The solids and brine fed to reactor 13 are proportioned so that the $Ca(OH)_2$ reacts with substantially all of the $MgCl_2$ to produce a $CaCl_2$ brine substantially free from $MgCl_2$, and the quantities are so adjusted that the $CaCl_2$ brine produced is just sufficient to provide that used in slaker 2a and mixer 3a. From reactor 13 the pulp passes to a thickener 14 the overflow from which passes to slaker 2a and mixer 3a, make-up $CaCl_2$ being added as need be.

The thickened pulp then passes from thickener 14 to a precarbonating container 15 to which there is added the $Mg(OH)_2$ fines from separator 12, together with the $CaCl_2$ brine containing some $MgCl_2$ which is the end brine of the magnesia branch. Hydro-separator 12 may be provided with an adjustment line, as shown, to supply coarse material to container 15 if need be.

The materials fed to the pre-carbonating container are proportioned so that substantially all of the $Ca(OH)_2$ will react with the remaining $MgCl_2$ to an extent such that there will be left not over about 0.5 per cent of $MgCl_2$. This reaction occurs quickly at 20° to 25° C., but it is important in producing free-filtering calcium carbonate to carry it substantially to completion. As disclosed in my copending applications Serial No. 402,935, filed July 18, 1941, and Serial No. 441,806, filed May 5, 1942, this condition corresponds to a pH of about 9.1 to 9.7, preferably 9.3 to 9.5.

From container 15 the material goes to a carbonator 16 where the $Mg(OH)_2$ present is reacted with the $CaCl_2$ and with $CO_2$ gas from kiln 1a, forming $CaCO_3$ and $MgCl_2$. At the end of this reaction the pH will be from 5 to 6. The resultant slurry goes to a settler 17. The underflow from this settler, $CaCO_3$, passes to a filter 18. The filtrate and wash water from filter 18 are passed with the overflow from thickener 17 to an evaporator 19 where the $MgCl_2$ is concentrated. The liquor from the evaporator passes through a cooler 20 and from thence is recycled in the system, as shown.

Both the $Mg(OH)_2$ and the $CaCO_3$ produced in this manner settle and filter rapidly, and wash easily, and in this embodiment there is added improvement in those properties of the $Mg(OH)_2$ due to the use of $MgCl_2$ in calcining and also to the removal of $Mg(OH)_2$ fines to the carbonate branch. The reaction which occurs in calcining is not certain, but as $MgCl_2$ in the kiln will in the presence of water vapor produce magnesia (MgO) and hydrogen chloride, I believe that the traces of the latter compound act in some way as a catalyst to promote conversion of the dolomite magnesia to a form which is more resistant to hydration and shows lesser tendency to production of colloidal hydration products, which impede settling and filtration, than is the case where the dolomite is calcined without having chloride present. The fact is clear, in any event, that very small amounts of $MgCl_2$ suffice.

The following data exemplify the benefits due to the use of chloride in accordance with the invention:

| Material | Filter rate, lbs./sq. ft. drum area/hr. |
| --- | --- |
| Average, 11 tests using 0.5% $MgCl_2$ | 8.0 |
| Average of 3 tests without $MgCl_2$[1] | 0.5 |

[1] 1 test not filterable.

According to the provisions of the patent statutes, I have explained the principle and method of practicing my invention and have described what I now consider to represent its best embodiment. However, I desire to have it understood that, within the scope of the appended claims, the invention may be practiced otherwise than as specifically described.

I claim:
1. In a process of separating magnesia from dolomite in which the dolomite is calcined and its lime content converted to magnesia by reaction with magnesium chloride, the steps consisting of adding to the raw dolomite from about 0.1 to 1 per cent by weight of magnesium chloride, and then calcining the mixture, and thereby converting the calcined dolomite to a form in which said magnesia filters at a substantially faster rate than magnesia produced in the same way from dolomite calcined without said chloride.

2. A process according to claim 1, said calcination being conducted to produce a calcine with not over about 0.3 per cent ignition loss.

3. That method of separating magnesia from dolomite which comprises adding to the raw dolomite from about 0.1 to 1 per cent of magnesium chloride, calcining the mixture, slaking the calcine to produce a free-flowing pulp, separating said pulp into coarse and fine fractions, reacting said coarse fractions with magnesium chloride brine and recovering magnesium hydrate, reacting said fine fraction separately with calcium chloride brine containing some magnesium chloride and then treating with carbon dioxide to form calcium carbonate and regenerate said brine.

4. That method of separating magnesia from dolomite which comprises adding to the raw dolomite from about 0.1 to 1 per cent of magnesium chloride, calcining the mixture, slaking the calcine to produce a free-flowing pulp, with calcium chloride brine, separating the slaked material into coarse and fine fractions, and reacting said fine fraction with magnesium chloride brine to regenerate said calcium chloride brine.

5. In a process of producing magnesia from dolomite, the steps comprising calcining the dolomite, slaking the calcine, separating the slaked calcine into coarse and fine fractions, reacting said coarse fraction with magnesium chloride, separating the reaction product into other coarse and fine fractions, passing said other coarse fraction to a filter, and reacting said fine fractions with calcium chloride brine containing some magnesium chloride and carbon dioxide and thereby producing calcium carbonate and regenerating magnesium chloride.

ROBERT D. PIKE.